United States Patent
Lu et al.

(10) Patent No.: US 11,664,958 B2
(45) Date of Patent: **\*May 30, 2023**

(54) FREQUENCY TRACKING FOR BEAMFORMED SYSTEMS

(71) Applicant: Apple Inc., Cupertino, CA (US)

(72) Inventors: Peng Lu, Sunnyvale, CA (US);
Qiaoyang Ye, Fremont, CA (US); Gang Xiong, Portland, OR (US); Glenn J. Bradford, Hillsboro, OR (US); Joonyoung Cho, Portland, OR (US); Jong-Kae Fwu, Sunnyvale, CA (US); Bishwarup Mondal, San Ramon, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/531,884

(22) Filed: Nov. 22, 2021

(65) Prior Publication Data

US 2022/0085962 A1    Mar. 17, 2022

Related U.S. Application Data

(63) Continuation of application No. 16/085,124, filed as application No. PCT/US2017/027297 on Apr. 13, 2017, now Pat. No. 11,190,327.

(Continued)

(51) Int. Cl.
*H04L 5/00* (2006.01)
*H04J 13/00* (2011.01)
*H04L 7/00* (2006.01)

(52) U.S. Cl.
CPC ........ *H04L 5/0098* (2013.01); *H04J 13/0062* (2013.01); *H04L 5/001* (2013.01); *H04L 5/0048* (2013.01); *H04L 7/007* (2013.01)

(58) Field of Classification Search
CPC ..... H04L 5/0098; H04L 5/001; H04L 5/0048; H04L 7/007; H04J 13/0062
See application file for complete search history.

(56) References Cited

U.S. PATENT DOCUMENTS

| 9,065,630 B1 * | 6/2015 | Xiao | ................. H04W 56/0085 |
| 9,641,230 B2 | 5/2017 | Park | |

(Continued)

FOREIGN PATENT DOCUMENTS

| EP | 2015489 A1 | 1/2009 |
| WO | 2008/143443 A1 | 11/2008 |

OTHER PUBLICATIONS

International Search Report Dated Oct. 27, 2017 for International Application PCT/US2017/027297.

(Continued)

*Primary Examiner* — Jael M Ulysse
(74) *Attorney, Agent, or Firm* — Eschweiler & Potashnik, LLC

(57) ABSTRACT

Systems, methods, and baseband processors are provided to generate or process symbols in a synchronization subframe. In one example, a method includes selecting non-consecutive orthogonal frequency division multiplexing (OFDM) symbols in a synchronization subframe. A transmitter is instructed to transmit demodulation reference symbols (DM-RS) on identical first sets of subcarriers in respective OFDM symbols of the selected non-consecutive OFDM symbols for a Physical Broadcast Channel (PBCH) using a same transmit beam, wherein a gap between two subcarriers in a respective set of the identical first sets of subcarriers is three subcarriers. The transmitter is instructed to transmit the PBCH on identical second sets of subcarriers in respective OFDM symbols in the selected non-consecutive OFDM symbols.

18 Claims, 5 Drawing Sheets

Related U.S. Application Data

(60) Provisional application No. 62/323,109, filed on Apr. 15, 2016, provisional application No. 62/324,671, filed on Apr. 19, 2016.

(56) References Cited

U.S. PATENT DOCUMENTS

| | | | |
|---|---|---|---|
| 11,190,327 B2* | 11/2021 | Lu | H04L 5/0098 |
| 2005/0152326 A1* | 7/2005 | Vijayan | H04L 27/2675 |
| | | | 370/343 |
| 2008/0305788 A1* | 12/2008 | Malladi | H04J 11/0069 |
| | | | 455/428 |
| 2009/0225722 A1 | 9/2009 | Cudak | |
| 2010/0118839 A1* | 5/2010 | Malladi | H04J 11/00 |
| | | | 370/336 |
| 2011/0149893 A1 | 6/2011 | Park et al. | |
| 2011/0170496 A1 | 7/2011 | Fong | |
| 2012/0106374 A1 | 5/2012 | Gaal | |
| 2012/0263124 A1 | 10/2012 | Gaal | |
| 2012/0307726 A1* | 12/2012 | Pi | H04L 5/0053 |
| | | | 370/328 |
| 2013/0156120 A1 | 6/2013 | Josiam | |
| 2013/0194931 A1 | 8/2013 | Lee | |
| 2013/0265945 A1* | 10/2013 | He | H04L 51/58 |
| | | | 370/329 |
| 2013/0301434 A1 | 11/2013 | Krishnamurthy | |
| 2013/0301542 A1 | 11/2013 | Krishnamurthy | |
| 2013/0336280 A1* | 12/2013 | Nordstrom | H04W 72/0446 |
| | | | 370/330 |
| 2013/0343318 A1* | 12/2013 | Gruet | H04L 5/0048 |
| | | | 370/329 |
| 2014/0120926 A1 | 5/2014 | Shin | |
| 2015/0049824 A1 | 2/2015 | Kim | |
| 2015/0109974 A1 | 4/2015 | Zeng | |
| 2015/0245323 A1 | 8/2015 | You | |
| 2015/0257132 A1 | 9/2015 | Park | |
| 2015/0358848 A1 | 12/2015 | Kim | |
| 2016/0029333 A1 | 1/2016 | Seo | |
| 2016/0065341 A1 | 3/2016 | Yoo | |
| 2016/0142241 A1* | 5/2016 | Sahlin | H04L 27/2656 |
| | | | 370/329 |
| 2016/0142989 A1* | 5/2016 | Hashemi | H04L 27/2655 |
| | | | 370/350 |
| 2017/0064685 A1* | 3/2017 | Rico Alvarino | H04W 72/005 |
| 2017/0273108 A1 | 9/2017 | Damnjanovic | |
| 2017/0289932 A1 | 10/2017 | Islam | |

OTHER PUBLICATIONS

Non-Final Office Action dated Feb. 18, 2021 in connection with U.S. Appl. No. 16/085,124.

Notice of Allowance dated Jul. 27, 2021 in connection with U.S. Appl. No. 16/085,124.

* cited by examiner

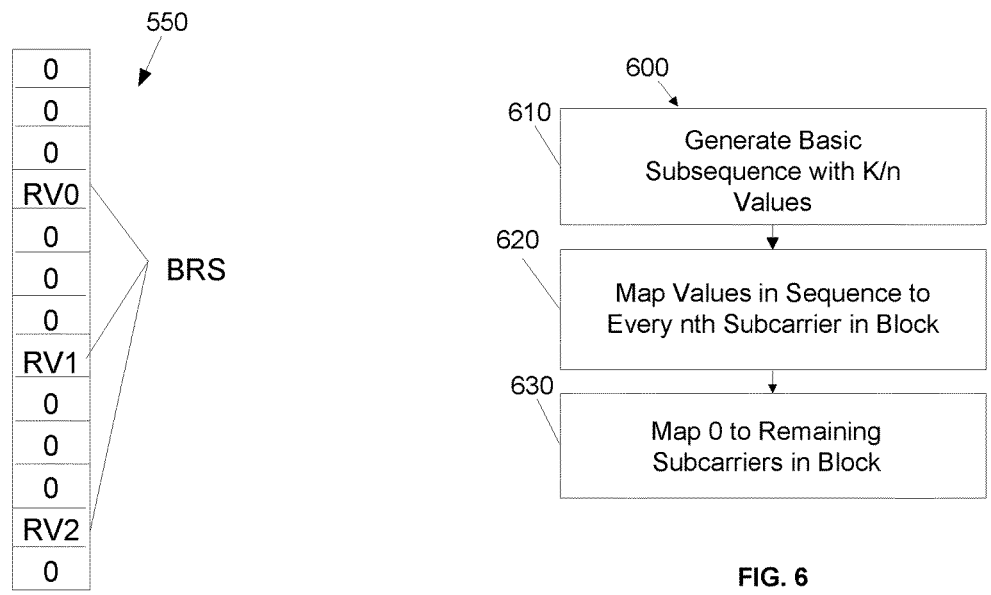
FIG. 5B
FIG. 6
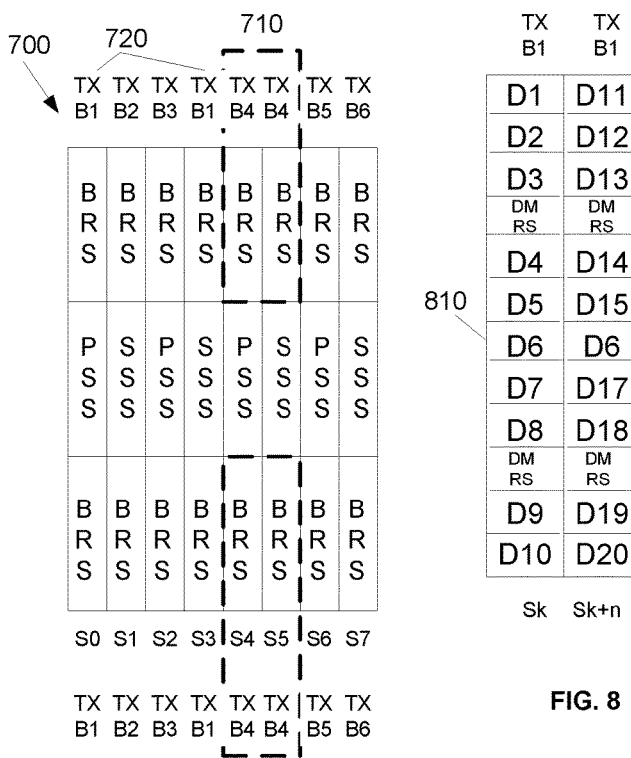
FIG. 7
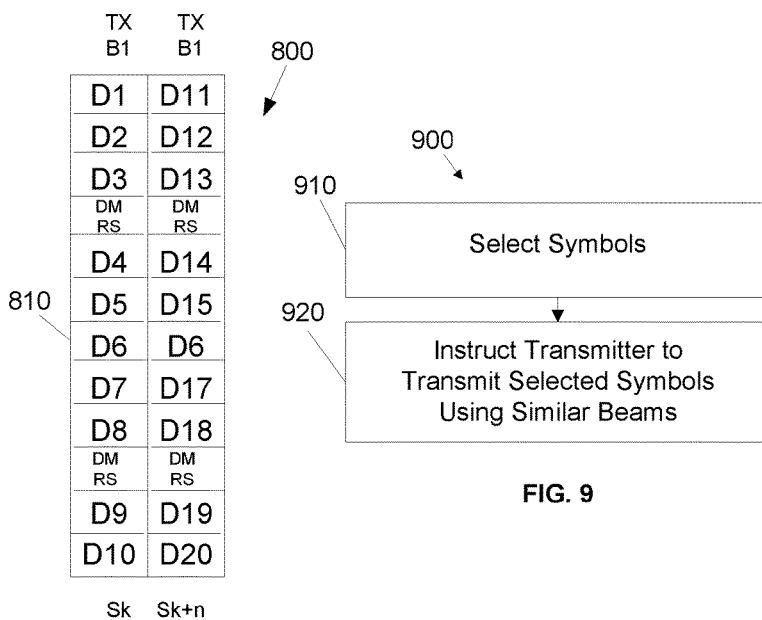
FIG. 8
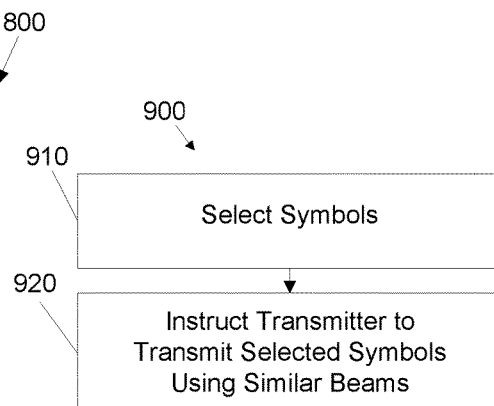
FIG. 9

FREQUENCY TRACKING FOR BEAMFORMED SYSTEMS

CROSS REFERENCE TO RELATED APPLICATIONS

This application is a Continuation of U.S. patent application Ser. No. 16/085,124 filed on Sep. 14, 2018, which is a National Phase entry application of International Patent Application No. PCT/US2017/027297 filed Apr. 13, 2017, which claims priority to U.S. Provisional Patent Application Ser. No. 62/323,109 filed on Apr. 15, 2016 and U.S. Provisional Patent Application Ser. No. 62/324,671, filed on Apr. 19, 2016, in the name of Peng Lu et al. which are hereby incorporated by reference in their entirety.

FIELD

The present disclosure relates to the field of wireless communications and in particular frequency tracking in beamforming communication systems, for example fifth generation (5G) communication systems.

BACKGROUND

Mobile communication has evolved significantly from early voice systems to today's highly sophisticated integrated communication platform. Third generation partnership project (3GPP) next generation wireless communication system fifth generation (5G) can provide access to information and sharing of data anywhere, anytime by various users and applications. In one aspect, 5G is a unified network/system targeted to meet vastly different, and often times conflicting, performance dimensions and services. Such diverse multi-dimensional constraints can be driven by different services and applications. In general, 5G will evolve based on 3GPP LTE-Advanced with additional potential new Radio Access Technologies (RATs) to enrich people lives with better, simple and seamless wireless connectivity solutions. 5G will enable everything connected by wireless and deliver fast, rich content and services.

5G systems will be implemented using a high frequency band (higher than 6 GHz frequency band, such as centimeter wave (cmWave) or millimeter wave (mmWave) band). High frequency band communication has attracted significant attention from the industry, since it can provide wider bandwidth to support future integrated communication systems. Beamforming is an important technology for the implementation of high frequency band systems due to the fact that the gains from beamforming can compensate for the severe path loss caused by atmospheric attenuation, improve the SNR, and also enlarge the coverage area. With beamforming, the antenna gain pattern is shaped like a cone pointing to a spatial area so that a high antenna gain can be achieved. At the transmitter, beamforming is achieved by applying a phase shift to an antenna array that is either one-dimension or two-dimension periodically placed. Dependent on the phase shift, multiple beams can be formed at a transmission point (TP) at a time and beams from different TPs can point to the same location. Similarly, the receiver can apply a phase shift to its antenna array to achieve large receive gain for a signal arriving from a specific spatial angle. Better receive signal quality is achieved when transmit and receive beams are aligned. Beamforming aligns the transmission beam to the target user equipment (UE) device so that the radiated energy is focused for higher energy efficiency and mutual UE device interference is suppressed.

One goal for the design of 5G systems is to minimize transmissions of signals which are not directly related to user data delivery in order to achieve higher system capacity, minimize network energy consumption, and reduce inter-cell interference. According to this design concept, "always-on" control and reference signals that are present in every transmitted subframe as well as the broadcast of system information should be minimized. For instance, cell specific reference signal (CRS) as defined in LTE specification may not be defined for 5G system.

BRIEF DESCRIPTION OF THE DRAWINGS

Some examples of circuits, apparatuses and/or methods will be described in the following by way of example only. In this context, reference will be made to the accompanying Figures.

FIGS. 2A and 2B depict two exemplary beamforming reference signal (BRS) sequences in a single OFDM symbol that can be used by a device to determine frequency offset.

FIGS. 5A and 5B depict two additional exemplary BRS sequences in a single OFDM symbol that can be used by a device to determine frequency offset.

FIG. 6 depicts an exemplary method for generating the exemplary BRS sequences of FIGS. 5A and 5B.

FIG. 7 depicts an exemplary synchronization subframe that identifies transmit beams that are used in the subframe.

FIG. 8 depicts an exemplary broadcast channel that can be designed to determine frequency offset.

FIG. 9 depicts an exemplary method for transmitting reference symbols in different OFDM symbols using the same transmit beam.

DETAILED DESCRIPTION

Figure 1:
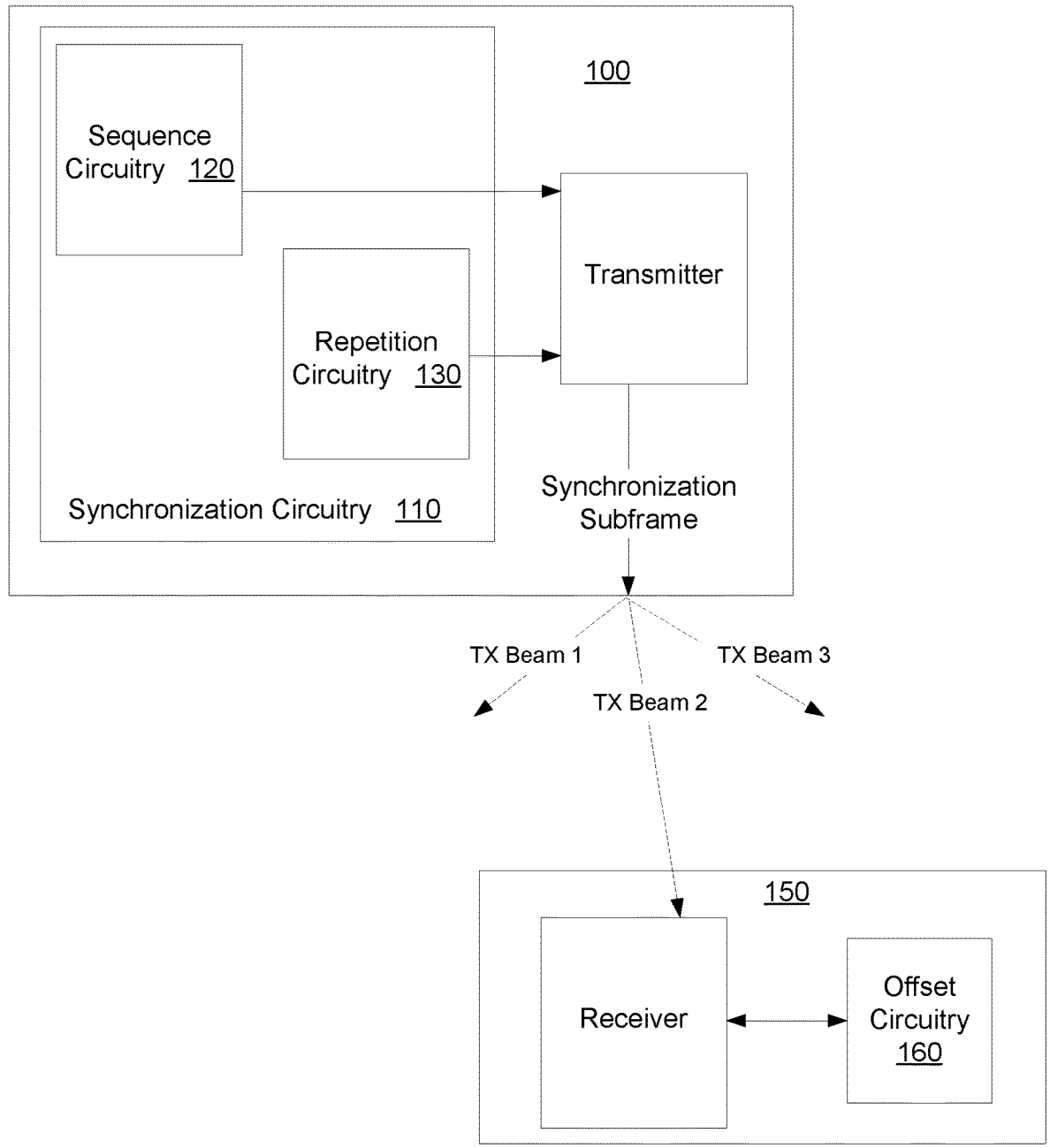
FIG. 1 depicts an exemplary base station transmitting a synchronization subframe to an exemplary device that is performing frequency tracking based on the synchronization subframe.

In an orthogonal frequency division multiplexing (OFDM) system, the frequency offset causes inter-carrier interference (ICI) and drifting of timing at the receiver. Therefore, in practical communications systems, the frequency offset should be estimated at the receiver and corrected in a real-time manner. In LTE, the frequency offset estimation is based on always-on signals like CRS, which is transmitted in every subframe. In 5G, always-on signals like CRS are removed. In this disclosure frequency offset is determined based on either a newly designed reference signal called a beam reference signal (BRS/xBRS) or a modification of an existing channel like the physical broadcast channel (xPBCH). The BRS may also be used for measuring signal quality of the beams. In 5G systems, the BRS may be transmitted in every OFDM symbol in a certain subframes, called "synchronization subframes." In one example, a synchronization subframe contains 14 OFDM symbols and the synchronization subframe occurs once every X subframes, (e.g., X=25). Alternatively, the BRS is transmitted in every OFDM symbol in a block. Such a block is referred to herein as a "synchronization signal block." In one example, a synchronization signal block includes 3 or 4 OFDM symbols and the synchronization signal block occurs once every 5, 10, 15, 20, or 40 milliseconds. In this disclosure, the synchronization subframe and synchronization signal block are used interchangeably without differentiation.

Each synchronization subframe includes a series of OFDM symbols with each symbol including predefined reference symbols (i.e., a range of subcarriers onto which are mapped reference signal values). During transmission of the synchronization subframe, the base station (e.g., evolved node B (eNB)) transmitter "sweeps" the transmit beam, meaning that different beamforming parameters are applied to the reference symbols in different OFDM symbols in the synchronization subframe. This sweeping mechanism helps a UE device to select the best transmit beam for use in communicating with the base station. As the UE device moves, a different transmit beam may be selected. Due to transmit beam sweeping during transmission of the OFDM symbols in the synchronization subframe, any given UE device may only receive a small subset of the OFDM symbols in the subframe which are transmitted using a beam pointing to the given UE device.

This reduction in the number of OFDM symbols received by the UE device combined with the less frequent transmission of the synchronization subframe that includes the BRS or other reference symbol used for offset tracking, presents challenges to the UE device in performing offset tracking. Described herein are new mechanisms to determine frequency offset utilizing reference symbols in a limited number of OFDM symbols (e.g., only one or two) in a synchronization subframe.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," "circuitry", and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising."

In the following description, a plurality of details is set forth to provide a more thorough explanation of the embodiments of the present disclosure. However, it will be apparent to one skilled in the art that embodiments of the present disclosure may be practiced without these specific details. In other instances, well-known structures and devices are shown in block diagram form rather than in detail in order to avoid obscuring embodiments of the present disclosure. In addition, features of the different embodiments described hereinafter may be combined with each other, unless specifically noted otherwise.

FIG. 1 illustrates an exemplary first device 100 (e.g., an eNB, base station, or other network access point) that is transmitting a synchronization subframe to a second exemplary device 150 (e.g., a UE device). The first device 100 includes a transmitter and synchronization circuitry 110. The synchronization circuitry 110 includes sequence circuitry 120 and repetition circuitry 130. The sequence circuitry 120 is configured to generate reference signal values (e.g., BRS values) that are mapped onto subcarriers in a reference symbol. The repetition circuitry 130 is configured to instruct the transmitter to transmit reference symbols in certain OFDM symbols in the synchronization subframe using a same transmit beam. While the synchronization circuitry 110 is illustrated as including both the sequence circuitry 120 and the repetition circuitry 130, in some examples, the synchronization circuitry includes only one of the two circuitries 120, 130.

As shown in FIG. 1, the synchronization subframe is transmitted using multiple transmit beams (beams 1-3 are shown in the illustrated example, but more or less than three beams may be used). To benefit from beamformed transmission, the device 150 may perform measurements on the available beams and inform the device 100 to use a beam that points to the device's location. In this way, the signal to interference and noise ratio (SINR) of the reception signal can be improved. However, due to factors like initial access, mobility of the device 150, change of propagation environment, and rotation of the device antenna, the beam direction that is best for the device may not be known or may be subject to change. As a result, the device may monitor the receive signal quality from all possible beams and notify the device 100 what single beam or a set of beams is considered good for its reception. In order to facilitate beam quality measurement, a reference symbol that encodes the BRS may be included in each symbol of the synchronization subframe transmitted by the base station. The BRS is a predefined sequence of values that is associated with a beam for its transmission. With OFDM communication systems, a large number of closely spaced orthogonal subcarrier signals are used to carry information symbols.

The second device 150 includes offset circuitry 160 configured to perform offset tracking. Offset tracking is accomplished by determining the frequency offset between device 100 and the device 150 and adjusting the receiver in the device 150 to compensate for the offset. As will be described in more detail with reference to FIG. 4, the offset circuitry 160 determines the frequency offset based on the reference symbols in the received synchronization subframe OFDM symbols.

As used herein, the term "circuitry" may refer to, be part of, or include an Application Specific Integrated Circuit (ASIC), an electronic circuit, a processor (shared, dedicated, or group, e.g., processor 1004 of FIG. 10), and/or memory (shared, dedicated, or group, e.g., storage media 1009 of FIG. 10) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. The processor may be configured to cooperate with the storage media and/or the synchronization circuitry 110 or offset circuitry 160 to provide higher-layer operations that include generating, analyzing, and processing signals encoding synchronization information such as reference signal values. The processor may include one or more single-core or multi-core processors. The processor may include any combination of general-purpose processors and dedicated processors including, for example, digital signal processors (DSPs), central processing units (CPUs), microprocessors, memory controllers (integrated or discrete), etc.

The storage media may be used to load and store data or instructions (collectively "logic") for operations performed by the processor. The storage media may include any combination of suitable volatile memory and non-volatile memory. The storage media may include any combination of various levels of memory/storage including, but not limited to, read-only memory (ROM) having embedded software instructions (e.g., firmware), random access memory (e.g., dynamic random access memory (DRAM)), cache, buffers, etc. The storage media may be shared among the various processors or dedicated to particular processors. In some embodiments, one or more of the processors may be combined with one or more storage media and, possibly other circuitry in a single chip, a single chipset, or disposed on a same circuit board in some embodiments.

Sequence Circuitry

Figures 2A, 2B:
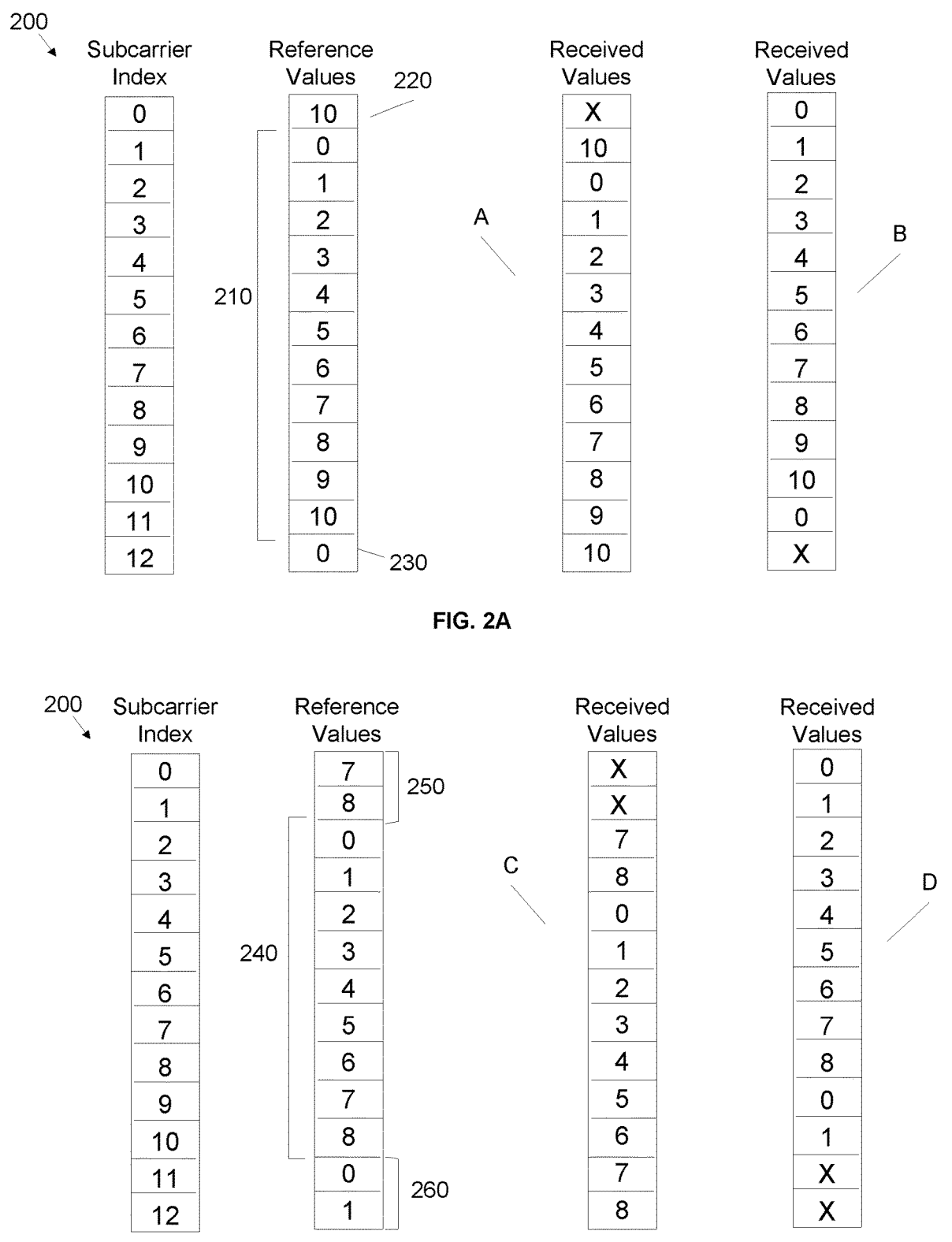

For a block interleaved BRS transmission scheme, different BRS antenna ports (APs) are multiplexed in a frequency division multiplexing (FDM) manner. One BRS AP includes multiple reference symbols, with each reference symbol mapped to continuous subcarriers forming a subcarrier block in the frequency domain. The channel may be constant within a subcarrier subblock in the frequency domain. FIGS. 2A and 2B illustrates an exemplary reference symbol 200. The reference symbol 200 illustrated in FIGS. 2A and 2B includes 13 subcarriers (indexed 0 to 12), however, any number of subcarriers may be included in a reference symbol. In one example, the reference symbol 200 encodes values of a BRS, physical broadcast channel (xPBCH) data, or any other type of reference signal.

The sequence circuitry 120 (FIG. 1) generates reference values (e.g., BRS signal) to be mapped onto the subcarriers in the reference symbol 200. To facilitate the calculation of frequency offset using only a single symbol, the sequence circuitry 120 generates a basic subsequence 210 that has fewer values than the number of subcarriers in the block. The number of values in the basic subsequence may be expressed as K-R1-R2. The basic subsequence is mapped onto a range of K–R1–R2 subcarriers (e.g., a continuous range in one example), leaving a first set of R1 unmapped subcarriers 220 above the original range at the beginning of the block and a second set of R2 unmapped subcarriers 230 below the original range at the end of the block. These subcarriers that do not carry the basic subsequence will be referred to as "guard subcarriers." The range to which the basic subsequence is mapped will be referred to herein as the "original range" of subcarriers. Either the first or second set of guard subcarriers may have zero members (i.e., R1 or R2 may be equal to 0). The sequence circuitry 120 maps values from the end of the basic sequence to the first set of guard subcarriers 220 above the basic subsequence. The sequence circuitry 120 maps values from the beginning of the basic sequence to the second set of guard subcarriers 230 below the basic subsequence.

The offset circuitry 160 determines the frequency offset based on the received values in the original range of subcarriers (e.g., the subcarriers to which were mapped the basic subsequence). By using subset of the reference symbol subcarriers, the offset circuitry 160 is able to determine a frequency offset that is less than or equal to the number of subcarriers in the first and second sets as will be described below.

In the example shown in FIG. 2A the basic subsequence 210 has two fewer values than the number of subcarriers in the block and the basic subsequence is mapped to the middle subcarriers, leaving one unmapped subcarrier in the first set 220 and one unmapped subcarrier in the second set 230. In the example shown in FIG. 2B the basic subsequence 240 has four fewer values than the number of subcarriers in the block and the basic subsequence is mapped to the middle subcarriers, leaving two unmapped leading subcarriers 250 and two unmapped trailing subcarriers 260. The original range of subcarriers is 1-11 and R1 and R2 both are equal to 1 in FIG. 2A. The original range of subcarriers is 2-10 and R1 and R2 both are equal to 2 in FIG. 2B.

In the example shown in FIGS. 2A and 2B, the basic subsequence is mapped to the middle subcarriers, leaving an equal number of unmapped subcarriers in the first and second sets of guard subcarriers (e.g., R1=R2). In other examples, the basic subsequence is not mapped to the middle range of subcarriers (or the difference between the number of subcarriers in the reference symbol and the number of values in the basic subsequence is an odd number) such that there may be an unequal number guard subcarriers in the first and second sets of subcarriers.

The inter-carrier interference (ICI), a result of frequency offset, causes the leakage of power from one subcarrier to the next subcarrier. In FIGS. 2A and 2B, the effects of two different frequency offsets are shown in received values A and the received values B which correspond to the reference symbol 200 as received by the UE device in two different frequency offset scenarios. The received values A indicate a positive frequency offset equal one full subcarrier Δf and the received values B indicate a negative frequency offset equal to one full subcarrier −Δf, where Δf represents the subcarrier spacing. In FIGS. 2A and 2B, the unknown symbols that are shifted into the reference symbol due to the frequency offset are denoted as X. While FIGS. 2A and 2B illustrate a frequency offset that is an whole multiple of Δf, other received values may indicate a frequency offset that is not a whole multiple of Δf (e.g., the values are partially shifted into the next subcarrier).

In one example, the sequence is generated to exhibit a good auto-correlation property. For the purposes of this description, a sequence with good auto-correlation means that when the sequence is shifted and correlated with the original sequence the resulting correlation is very low. In one example, the sequence is generated from Zadoff-Chu (ZC) sequence. Due to the ideal auto-correlation property of ZC sequence, the sequence that remains in original subcarriers and the sequence that is shifted into the original subcarriers are orthogonal to each other and therefore can be separated.

Figure 3:
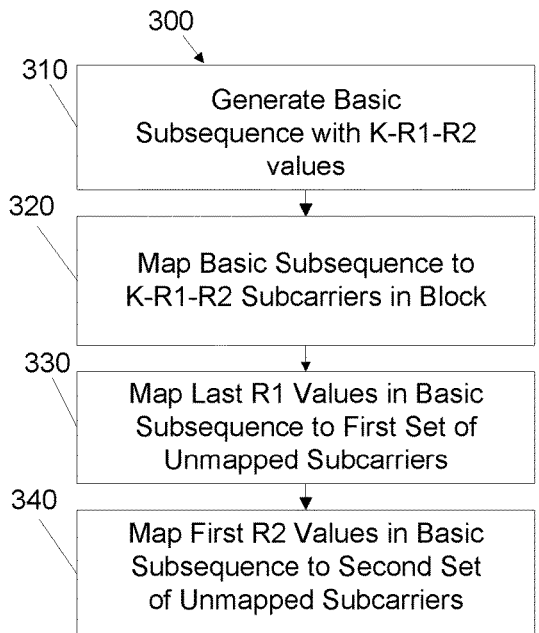
FIG. 3 depicts an exemplary method for generating a BRS sequence.

FIG. 3 illustrates an exemplary method 300 for generating a reference symbol that includes reference values mapped to a block of K subcarriers of an OFDM symbol. The method 300 may be performed by the sequence circuitry 120 of FIG. 1. The method includes, at 310, generating data corresponding to a basic subsequence including a sequence of less than K (i.e., K−R1−R2) reference values, where R1 and R2 are integers such that 1≤R1+R2<K. The values for R1 and R2 are selected to provide a desired number of Δt 320, data corresponding to the basic subsequence is mapped to an original range of K−R1−R2 contiguous subcarriers in the block such that there is a first set of R1 unmapped subcarriers above the original range of subcarriers and a second set of R2 unmapped subcarriers below the original range of subcarriers. At 330, the method includes mapping data corresponding to a last R1 values in the basic subsequence to the first set of unmapped subcarriers and, at 340, mapping data corresponding to a first R2 values in the basic subsequence to the second set of unmapped subcarriers.

The offset circuitry 160 in the device 150 has a priori knowledge of the sequence of values in the reference symbol 200 and is thus able to compare the received values with the values in the reference symbol. In order to estimate the frequency offset, the offset circuitry 160 measures the ratio between power that is leaked into adjacent subcarriers and the power that remains in original subcarriers.

Assuming each block has K subcarriers, which are indexed from 0 to K−1, and a basic subsequence of length K−2 (as shown in FIG. 2A) employed at transmitter. The basic ZC subsequence is denoted as $r_{u,v}^{(\infty)}(n)=\exp(jan)\cdot \bar{r}_{u,v}(n), n=0, 1, \ldots, K-3$. Here, $\bar{r}_{u,v}(n)$ is the basic subsequence for the transmission of BRS; u is the sequence-group number and v is the sequence number; and a is the cyclic shift. The basic ZC sequence is mapped to the original range of subcarriers in block b from subcarrier 1 to K−2.

The subcarrier 0 is mapped with $r_{u,v}^{(\infty)}(K-3)$ and subcarrier K−1 is mapped with $r_{u,v}^{(\infty)}(0)$. In summary, the data symbols mapped to subcarrier 0 to K−1 within block b are $[r_{u,v}^{(\infty)}(K-3)\ r_{u,v}^{(\infty)}(0)\ r_{u,v}^{(\infty)}(1) \ldots r_{u,v}^{(\infty)}(K-3)\ r_{u,v}^{(\infty)}(0)]$. At the receiver, the received symbols on the K subcarriers is denoted as $y(n), n=0, 1, \ldots, K-1$. When assuming the channel is constant within the block, one metric that can be used to measure the positive frequency offset is:

$$r_b^+ = \frac{\sum_{n=1}^{K-2} y^*(n) r_{u,v}^{(\alpha)}(n-1)}{\sum_{n=1}^{K-2} y^*(n) r_{u,v}^{(\alpha)}(\mathrm{mod}(n-2, K-2))} \quad \text{EQ 1}$$

In equation 1, the numerator is to calculate the power of the reference values that remain in original subcarrier range from 1 to K−2 while the denominator is to calculate the power of the reference values that is shifted into subcarrier 1 to K−2 from symbols mapped onto subcarriers 0 to K−3.

Similarly, the metric that can be used to measure the negative frequency offset is:

$$r_b^- = \frac{\sum_{n=1}^{K-2} y^*(n) r_{u,v}^{(\alpha)}(n-1)}{\sum_{n=1}^{K-2} y^*(n) r_{u,v}^{(\alpha)}(\mathrm{mod}(n, K-2))} \quad \text{EQ 2}$$

In equation 2, the denominator is to calculate the power that is shifted into subcarrier 1 to K−2 from symbols mapped to subcarrier 2 to K−1.

The leaked power and remaining power can be combined from all reference symbols mapped to different subcarrier subblocks in the same OFDM symbol to improve performance.

Note that the basic BRS subsequence $r_{u,v}^{(\infty)}(n)$, 0, 1, ..., K−3 can be generated as a function of, including but not limited to, the following parameters: physical cell ID, symbol index, antenna port index and subblock index. In this manner, the offset circuitry 160 can determine the BRS values in the subsequence independent of the base station.

To increase the range of frequency offset estimation to +/−mΔ, the length of basic subsequence is K−2m and the basic sequence is mapped to subcarrier index m to K−m−1. FIG. 2B shows the mapping when m=2 and the number of subcarriers in a block is 13. The symbols mapped to subcarrier index 0 to m−1 are the same as symbols mapped to subcarrier index from K−2m to K−m−1. Also, the symbols mapped to subcarrier index K−m to K−1 are the same as symbols mapped to subcarrier index from m to 2m−1.

Figure 4:
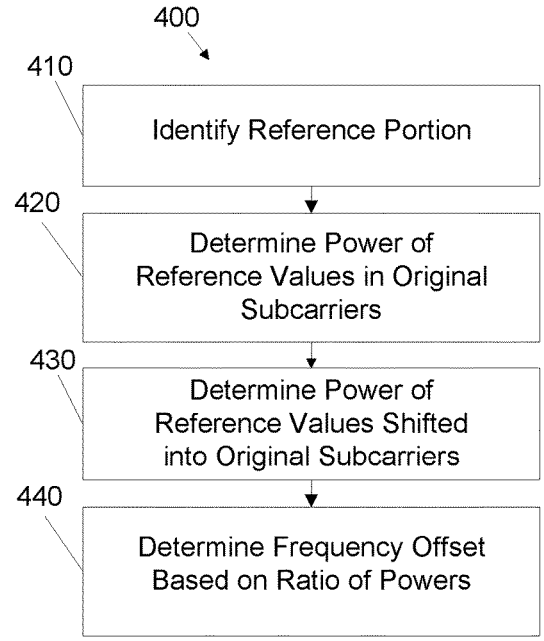
FIG. 4 depicts an exemplary method for determining frequency offset based on the BRS sequence of FIGS. 2A and 2B.

FIG. 4 illustrates an exemplary method 400 for determining a frequency offset between the UE device performing the method and a transmitter of a second device. The method 400 may be performed by the offset circuitry 160 of FIG. 1. The method includes, at 410, identifying a reference symbol that includes data corresponding to a sequence of reference values mapped to a block of K subcarriers indexed from 0 to K−1 of a symbol received from the second device. At 420, a first power of reference values in a basic subsequence mapped to an original range of subcarriers that includes less than K subcarriers is determined. At 430, a second power of the reference values in the basic subsequence shifted into the original range of subcarriers is determined. The method includes, at 440, determining the frequency offset based at least on a ratio of the first power to the second power.

Figure 5A:
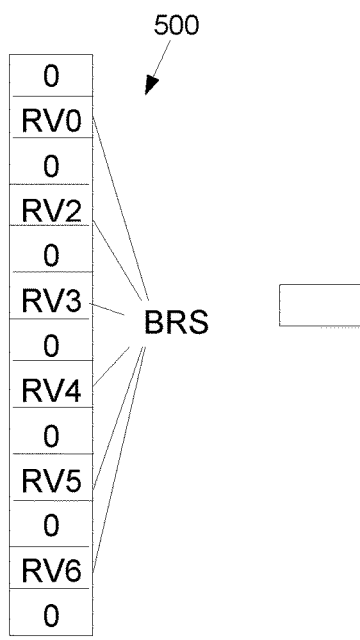
Figure 5A:
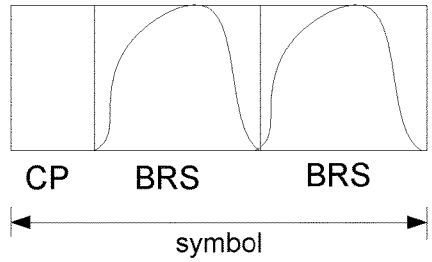

FIG. 5A illustrates an exemplary BRS reference symbol 500 in which the repetition circuitry 120 utilizes an interleaved frequency-division multiple access (IFDMA) structure for the BRS reference symbol to be transmitted for each BRS antenna port (AP). In particular, BRS values are mapped in every pth subcarrier in the frequency domain within BRS block, while the remaining subcarriers are set to zero. In FIG. 5A, p=2. Based on this structure, after filtering the corresponding BRS block, the transmitted signal during the time period of a symbol consists of p repetitions of the same shortened sequence. The frequency offset at the receiver causes a phase ramp and the offset circuitry 160 estimates the phase ramp by performing a correlation between the different received instances of the shortened sequence.

FIG. 5B illustrates one example of the IFDMA based BRS reference symbol transmission scheme in which p=4, so that 4 repetitions of the BRS reference symbol can be created in the time domain after filtering the corresponding BRS reference symbol. It should be noted that the similar design can be straightforwardly extended to other BRS resource mapping schemes including localized or distributed resource mapping, or cases where BRS resources are interleaved or block interleaved in frequency.

FIG. 6 illustrates an exemplary method 600 that may be performed by a base station to generate a reference symbol in a synchronization subframe including reference values mapped to a block of K subcarriers indexed from 0 to K−1 of a symbol. The method includes, at 610, generating data corresponding to a sequence of K/n reference values, where n is an integer greater than 1. At 620, the data corresponding to the sequence is mapped to every nth subcarrier in the block and, at 630, data corresponding to zero is mapped to the remaining subcarriers in the block.

It can be seen from the foregoing description that using a subset of subcarriers in a reference symbol to carry a basic subsequence and repeating values from the basic subsequence in leading and trailing subcarriers or an alternating sequence of reference values and zeroes allows a receiving device to determine offset frequency using a single reference symbol in one OFDM symbol of beam transmission.

Repetition Circuitry

The repetition circuitry 130 of FIG. 1 is configured to select certain resource blocks for repeated transmission using a same transmit beam or similar transmit beams. This allows a UE device that is communicating with the base station to determine the frequency offset based on the reference symbols in the OFDM symbols transmitted with the same or similar transmit beams as the beam being used by the UE device. For the purposes of this description, a unique transmit beam can be defined as resulting from a unique set of beamforming parameters. Two transmit beams are "similar" when a UE device can neglect the difference in the transmit beams and treat them as identical when determining frequency offset without an unacceptable loss of accuracy.

Synchronization signals are defined to support initial timing synchronization and beam acquisition. Synchronization signals include a primary synchronization signal (PSS), a secondary synchronization signal (SSS), an extended synchronization signal (ESS), as well as a beam reference signal (BRS). The PSS, SSS and ESS can be used to derive symbol, subframe, and frame timing as well as the physical cell identity. Additionally, a coarse estimate of the frequency offset may be derived from these signals.

One example of resource mapping for a synchronization subframe 700 (only symbols S0-S7 of the subframe 700 are shown for simplicity) of 5G synchronization signals (xPSS/xSSS/xESS) is shown in FIG. 7. The PSS and SSS Physical Resource Blocks (PRBs) onto which are mapped the PSS and SSS signals are shown in FIG. 7 as occupying the central PRBs. However, the repetition techniques described herein are applicable to different xPSS/xSSS/xESS designs. It should be noted that transmit beam sweeping is applied on the transmission of synchronization signals across different OFDM symbols within one subframe. The 5G PSS and SSS may be transmitted on consecutive OFDM symbols using the same frequency resources and analog beamforming weights to enable coherent reception of the SSS based on channel estimates derived from the PSS observation.

The purpose of the BRS is to allow the UE device to determine a preferred base station (e.g., eNB) transmission/reception beam direction for use in communication and possibly to determine the UE device's own transmission/reception beam. A BRS resource may span N PRBs in frequency and one OFDM symbol in time with different BRS resources being transmitted using different analog beamforming weights. The analog beamforming weights vary over BRS resource and time in order to sweep the transmission beams over the entire cell area and spatial domain. It should be noted that examples herein may not be limited in scope to the localized mapping in frequency of the BRS depicted in FIG. 7, but may be generally applicable to cases where BRS resources are interleaved or block interleaved in frequency.

BRS and 5G physical broadcast signal (xPBCH) may be multiplexed in one symbol. In one option, the xPBCH signal can be transmitted adjacent to the synchronization signals while the BRS blocks are transmitted around the xPBCH. Alternatively, the xPBCH blocks and the BRS blocks are interleaved and occupy the remaining frequency resource excluding the central PRBs used for synchronization signals.

In FIG. 7, multiple repetition schemes (e.g., consecutive 710 and non-consecutive 720 symbol repetition) are shown with reference to a single reference symbol 500. In other examples, only a single repetition is scheme is used in the same synchronization subframe. For example, as indicated by 710 the BRS reference symbols occupying identical frequency resources on two consecutive OFDM symbols S4 and S5 are transmitted using the same transmit beam TXB4 (i.e., as defined by a unique set of analog/hybrid beamforming weights). When the same transmit beam is used to transmit a reference symbol it means that the repetition circuitry instructs the transmitter to use the beamforming weights of a BRS reference symbol in a first symbol of the synchronization subframe on the same BRS reference symbol in a second symbol of the synchronization subframe. This enables a UE device located in the analog/hybrid beam pattern of the transmit beam TXB4 to observe two consecutive symbols of BRS. After demodulating the known BRS resource elements, the phase difference between resource elements on the same subcarrier but different OFDM symbols can be calculated and averaged to derive an estimate of the frequency offset. With this scheme it is theoretically possible to correct a positive or negative frequency offset of up to half the OFDM subcarrier spacing.

In one example, every pair of consecutive BRS reference symbols is transmitted using the same transmit beam. Of course, repetition of the same analog beam weights in this manner will double the BRS beam sweep time of the base station. Based on this design, the UE device may calculate the phase difference for fine frequency offset tracking in BRS reference symbols between two consecutive OFDM symbols. It should be noted that various embodiments may not be limited in scope to the localized mapping in frequency of the BRS reference symbols depicted in FIG. 7, but is applicable to cases where BRS resources are interleaved or block interleaved in frequency. Additionally, although not shown in FIG. 7, ESS may or may not be transmitted adjacent to the PSS/SSS signals.

In another example, as indicated by 720 the repetition circuitry selects non-consecutive symbols for transmission by the same transmit beam (e.g., S0 and S3 in FIG. 7). The number of OFDM symbols between the symbols being transmitted with the same transmit beam provides a tradeoff between the accuracy of the frequency offset estimation and the range of correctable frequency offsets. In general, a delay of S OFDM symbols restricts the correctable frequency offset to $\pm 1/(2S)$ of the subcarrier spacing.

In the example shown in FIG. 7, only a subset of the transmit beams used for BRS reference symbol transmission in a synchronization subframe are repeated. Further, for different synchronization subframes, different symbols with same transmit beams applied on BRS reference symbols can be defined. As mentioned above, with the same beam applied on the BRS reference symbol transmission, fine frequency offset tracking may be achieved.

By reducing the number of BRS reference symbols transmitted with the same transmit beam within a subframe, the impact to beam sweeping time at the base station can be reduced, although it will still be longer than the sweep time without repetition. The base station scheduler can make intelligent decisions about which transmit beams to include in the repetition opportunities (e.g., based on what beams are actively being used to serve UE devices in the cell).

The configuration of which BRS reference symbols or the OFDM symbol index within a synchronization subframe to be transmitted using the same transmit beam can be predefined in the specification or configured by higher layers via 5G master information block (xMIB), 5G system information block (xSIB), or RRC signaling. Alternatively, the configuration or the OFDM symbols allocated transmission with the same transmit beams for fine frequency offset tracking can be derived as a function of one or more parameters: physical cell ID or virtual cell ID or subframe/subframe/slot index. Further, the configuration may be cell specific or UE device specific. In a latter case, base station may allocate certain resources for BRS reference symbol transmission with same beams for one or a group of UE devices.

In one example, the same transmit beams are always applied on the BRS reference symbol transmission in particular OFDM symbols (e.g., 10 and 11 or 12 and 13) for all synchronization subframes, respectively. For the remaining OFDM symbols within one synchronization subframe, different transmit beams are applied on the BRS transmission.

In another example, symbol positions with the same transmit beam applied for the BRS reference symbol transmission can be different for different synchronization subframes. For example, in subframe #0, the same beams may be applied on the symbol #2 and #3 for BRS reference symbol transmission; while in subframe #25, the same beams may be applied on the symbol #4 and #6 for BRS reference symbol transmission.

In one example, the UE device may assume highly correlated beams are applied for BRS reference symbol transmission on consecutive or non-consecutive symbols. In this case, the base station may not use the same exact beams for BRS resource block transmission, but rather highly correlated beams. With highly correlated beams, the UE device may still be able to perform fine frequency offset tracking with reasonably good performance. It should be noted that when highly correlated beams are applied for BRS reference symbol transmission on non-consecutive symbols, a fixed gap between non-consecutive symbols may be defined to allow the UE device to estimate the frequency offset.

FIG. 8 illustrates an example reference symbol 800 that corresponds to the xPBCH portion of the symbol (e.g., adjacent to BRS PRBs in some examples). In this example, the repetition circuitry 130 selects xPBCH data for repetition in adjacent or selected non-adjacent symbols such that one xPBCH transmission may span two OFDM symbols that are transmitted using the same transmit beam. In the case when transmit diversity is applied for the transmission of xPBCH, DM-RS for two APs in two OFDM symbols can be multiplexed in a Code Division Multiplexing (CDM) manner.

FIG. 8 illustrates one example of a DM-RS pattern for the xPBCH with two APs. In particular, DM-RS for two APs use different orthogonal cover code (OCC). For instance, for AP0, OCC with [1 1] is applied while for AP1, OCC with [1 −1] is applied. Further, the gap between two DM-RS in the frequency domain is K resource elements. In one example, K=3. To further improve the frequency offset tracking performance, the same xPBCH data symbol 810 (e.g., D6) is mapped on two consecutive or non-consecutive OFDM symbols (e.g., sk and sk+n) using the same transmit beam (e.g., TX1). In this case, the UE device may simply calculate the phase difference on the xPBCH data resource elements between the two OFDM symbols to estimate the frequency offset. To achieve this, the scrambling seed for the transmission of xPBCH on different OFDM symbols should not be defined as a function of symbol index. Further, xPBCH coding is only applied on the first OFDM symbol, while on the second OFDM symbol to be transmitted using the same beam, repetition of xPBCH coding on the first symbol is applied.

FIG. 9 illustrates a method 900 that may be performed by a base station device to control transmission of symbols in a synchronization subframe. The method includes, at 910, selecting at least two symbols in a same synchronization subframe. At 920, the transmitter is instructed to transmit reference symbols in the selected symbols using similar transmit beams, wherein each transmit beam is defined by a set of beamforming parameters. In one example, the reference symbol is a BRS reference symbol and in another example, the reference symbol is an xPBCH reference symbol.

It can be seen from the foregoing description that by transmitting reference symbols in selected symbols using the same transmit beam allows a UE device to determine frequency offset using very few (e.g., two) received symbols.

Example Device

Figure 10:
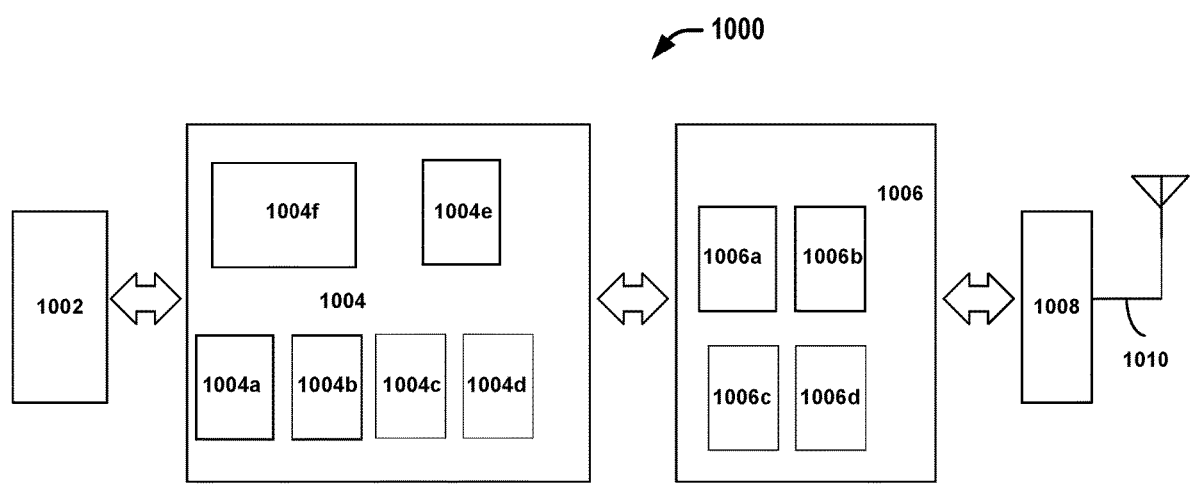
FIG. 10 illustrates example components of a device, according to one embodiment of the disclosure.

Embodiments described herein may be implemented into a system using any suitably configured hardware and/or software. FIG. 10 illustrates, for one embodiment, example components of a device 1000. The device 1000 may be utilized as a User Equipment (UE) device or an evolved node B (eNB) device or E-UTRAN equipment. In some embodiments, the device 1000 may include application circuitry 1002, baseband circuitry 1004, Radio Frequency (RF) circuitry 1006, front-end module (FEM) circuitry 1008 and one or more antennas 1010, coupled together at least as shown.

The application circuitry 1002 may include one or more application processors. For example, the application circuitry 1002 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications, such as a VMIMO application as described and/or operating systems to run on the system.

The baseband circuitry 1004 may include circuitry such as, but not limited to, one or more single-core or multi-core processors. The baseband circuitry 1004 may include one or more baseband processors and/or control logic to process baseband signals received from a receive signal path of the RF circuitry 1006 and to generate baseband signals for a transmit signal path of the RF circuitry 1006. Baseband processing circuitry 1004 may interface with the application circuitry 1002 for generation and processing of the baseband signals and for controlling operations of the RF circuitry 1006. For example, in some embodiments, the baseband circuitry 1004 may include a second generation (2G) baseband processor 1004*a*, third generation (3G) baseband processor 1004*b*, fourth generation (4G) baseband processor 1004*c*, and/or other baseband processor(s) 1004*d* for other existing generations, generations in development or to be developed in the future (e.g., fifth generation (5G), 6G, etc.). The baseband circuitry 1004 (e.g., one or more of baseband processors 1004*a-d*) may handle various radio control functions that enable communication with one or more radio networks via the RF circuitry 1006. The radio control functions may include, but are not limited to, signal modulation/demodulation, encoding/decoding, radio frequency shifting, etc. In some embodiments, modulation/demodulation circuitry of the baseband circuitry 1004 may include Fast-Fourier Transform (FFT), precoding, and/or constellation mapping/demapping functionality. In some embodiments, encoding/decoding circuitry of the baseband circuitry 1004 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1004 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 1004*e* of the baseband circuitry 1004 may be configured to run elements of the protocol stack for signaling of the PHY, MAC, RLC, PDCP and/or RRC layers. In some embodiments, the baseband circuitry may include one or more audio digital signal processor(s) (DSP) 1004*f*. The audio DSP(s) 1004*f* may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1004 and the application circuitry 1002 may be implemented together such as, for example, on a system on a chip (SOC).

In some embodiments, the baseband circuitry 1004 may provide for communication compatible with one or more radio technologies. For example, in some embodiments, the baseband circuitry 1004 may support communication with an evolved universal terrestrial radio access network (EU-TRAN) and/or other wireless metropolitan area networks (WMAN), a wireless local area network (WLAN), a wireless personal area network (WPAN). Embodiments in which the baseband circuitry 1004 is configured to support radio communications of more than one wireless protocol may be referred to as multi-mode baseband circuitry.

RF circuitry 1006 may enable communication with wireless networks using modulated electromagnetic radiation through a non-solid medium. In various embodiments, the RF circuitry 1006 may include switches, filters, amplifiers, etc. to facilitate the communication with the wireless network. RF circuitry 1006 may include a receive signal path which may include circuitry to down-convert RF signals received from the FEM circuitry 1008 and provide baseband signals to the baseband circuitry 1004. RF circuitry 1006 may also include a transmit signal path which may include circuitry to up-convert baseband signals provided by the baseband circuitry 1004 and provide RF output signals to the FEM circuitry 1008 for transmission.

In some embodiments, the RF circuitry 1006 may include a receive signal path and a transmit signal path. The receive signal path of the RF circuitry 1006 may include mixer circuitry 1006*a*, amplifier circuitry 1006*b* and filter circuitry 1006*c*. The transmit signal path of the RF circuitry 1006 may include filter circuitry 1006*c* and mixer circuitry 1006*a*. RF circuitry 1006 may also include synthesizer circuitry 1006*d* for synthesizing a frequency for use by the mixer circuitry 1006*a* of the receive signal path and the transmit signal path. In some embodiments, the mixer circuitry 1006*a* of the receive signal path may be configured to down-convert RF signals received from the FEM circuitry 1008 based on the synthesized frequency provided by synthesizer circuitry 1006*d*. The amplifier circuitry 1006*b* may be configured to amplify the down-converted signals and the filter circuitry 1006*c* may be a low-pass filter (LPF) or band-pass filter (BPF) configured to remove unwanted signals from the down-converted signals to generate output baseband signals. Output baseband signals may be provided to the baseband circuitry 1004 for further processing. In some embodiments, the output baseband signals may be zero-frequency baseband signals, although this is not a requirement. In some embodiments, mixer circuitry 1006*a* of the receive signal path may comprise passive mixers, although the scope of the embodiments is not limited in this respect.

In some embodiments, the mixer circuitry 1006*a* of the transmit signal path may be configured to up-convert input baseband signals based on the synthesized frequency provided by the synthesizer circuitry 1006*d* to generate RF output signals for the FEM circuitry 1008. The baseband signals may be provided by the baseband circuitry 1004 and may be filtered by filter circuitry 1006*c*. The filter circuitry 1006*c* may include a low-pass filter (LPF), although the scope of the embodiments is not limited in this respect.

In some embodiments, the mixer circuitry 1006*a* of the receive signal path and the mixer circuitry 1006*a* of the transmit signal path may include two or more mixers and may be arranged for quadrature downconversion and/or upconversion respectively. In some embodiments, the mixer circuitry 1006*a* of the receive signal path and the mixer circuitry 1006*a* of the transmit signal path may include two or more mixers and may be arranged for image rejection (e.g., Hartley image rejection). In some embodiments, the mixer circuitry 1006*a* of the receive signal path and the mixer circuitry 1006*a* may be arranged for direct downconversion and/or direct upconversion, respectively. In some embodiments, the mixer circuitry 1006*a* of the receive signal path and the mixer circuitry 1006a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1006 may include analog-to-digital converter (ADC) and digital-to-analog converter (DAC) circuitry and the baseband circuitry 1004 may include a digital baseband interface to communicate with the RF circuitry 1006.

In some dual-mode embodiments, a separate radio IC circuitry may be provided for processing signals for each spectrum, although the scope of the embodiments is not limited in this respect.

In some embodiments, the synthesizer circuitry 1006d may be a fractional-N synthesizer or a fractional N/N+1 synthesizer, although the scope of the embodiments is not limited in this respect as other types of frequency synthesizers may be suitable. For example, synthesizer circuitry 1006d may be a delta-sigma synthesizer, a frequency multiplier, or a synthesizer comprising a phase-locked loop with a frequency divider.

The synthesizer circuitry 1006d may be configured to synthesize an output frequency for use by the mixer circuitry 1006a of the RF circuitry 1006 based on a frequency input and a divider control input. In some embodiments, the synthesizer circuitry 1006d may be a fractional N/N+1 synthesizer.

In some embodiments, frequency input may be provided by a voltage controlled oscillator (VCO), although that is not a requirement. Divider control input may be provided by either the baseband circuitry 1004 or the applications processor 1002 depending on the desired output frequency. In some embodiments, a divider control input (e.g., N) may be determined from a look-up table based on a channel indicated by the applications processor 1002.

Synthesizer circuitry 1006d of the RF circuitry 1006 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1006d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1006 may include an IQ/polar converter.

FEM circuitry 1008 may include a receive signal path which may include circuitry configured to operate on RF signals received from one or more antennas 1010, amplify the received signals and provide the amplified versions of the received signals to the RF circuitry 1006 for further processing. FEM circuitry 1008 may also include a transmit signal path which may include circuitry configured to amplify signals for transmission provided by the RF circuitry 1006 for transmission by one or more of the one or more antennas 1010. When used in a mobile device, FEM circuitry 1008 may also include a transmit and receive path for device-to-device communications received directly from another mobile device, without traveling through the E-UTRAN (e.g. device-to-device interface circuitry). When used in a mobile device, FEM circuitry 1008 may also include a transmit and receive path for cellular communications received from the eNB or E-UTRAN (e.g. cellular interface circuitry).

In some embodiments, the FEM circuitry 1008 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 1006). The transmit signal path of the FEM circuitry 1008 may include a power amplifier (PA) to amplify input RF signals (e.g., provided by RF circuitry 1006), and one or more filters to generate RF signals for subsequent transmission (e.g., by one or more of the one or more antennas 1010.

In some embodiments, the device 1000 may include additional elements such as, for example, memory/storage, display, camera, sensor, and/or input/output (I/O) interface.

While the systems, circuitry and methods have been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure.

Examples can include subject matter such as a method, means for performing acts or blocks of the method, at least one machine-readable medium including instructions that, when performed by a machine cause the machine to perform acts of the method or of an apparatus or system for concurrent communication using multiple communication technologies according to embodiments and examples described herein.

The foregoing description of one or more implementations provides illustration and description, but is not intended to be exhaustive or to limit the scope of the example embodiments to the precise form disclosed. Modifications and variations are possible in light of the above teachings or may be acquired from practice of various implementations of the example embodiments.

The invention claimed is:

1. An apparatus for a base station configured to generate symbols for transmission in a synchronization subframe, wherein the apparatus is configured to:
   select non-consecutive orthogonal frequency division multiplexing (OFDM) symbols in the synchronization subframe; and
   instruct a transmitter to transmit demodulation reference symbols (DM-RS) on identical first sets of subcarriers in respective OFDM symbols of the selected non-consecutive OFDM symbols for a Physical Broadcast Channel (PBCH) using a same transmit beam, wherein a gap between two subcarriers in a respective set of the identical first sets of subcarriers is three subcarriers; and
   instruct the transmitter to transmit the PBCH on identical second sets of subcarriers in respective OFDM symbols in the selected non-consecutive OFDM symbols.

2. The apparatus of claim 1, further configured to select the non-consecutive OFDM symbols based on one or more of: a specification, a configuration communicated in a 5G master information block, a radio resource control (RRC) signal, a configuration communicated in a 5G system information block, a physical cell identifier, a virtual cell identifier, or a subframe/subframe/slot index.

3. The apparatus of claim 1, further configured to instruct the transmitter to transmit the PBCH on adjacent frequency resources to a synchronization signal.

4. The apparatus of claim 3, further configured to instruct the transmitter to transmit a primary synchronization signal (PSS) and a second synchronization signal (SSS) on different symbols of the selected non-consecutive OFDM symbols.

5. A method, comprising:
   selecting non-consecutive orthogonal frequency division multiplexing (OFDM) symbols in a synchronization subframe; and
   transmitting demodulation reference symbols (DM-RS) on identical first sets of subcarriers in respective OFDM symbols of the selected non-consecutive OFDM symbols for a Physical Broadcast Channel (PBCH) using a same transmit beam, wherein a gap between two subcarriers in a respective set of the identical first sets of subcarriers is three subcarriers; and
   transmitting the PBCH on identical second sets of subcarriers in respective OFDM symbols in the selected non-consecutive OFDM symbols.

6. The method of claim 5, comprising transmitting the PBCH on adjacent frequency resources to a synchronization signal.

7. The method of claim 6, comprising transmitting a primary synchronization signal (PSS) and a second synchronization signal (SSS) on different symbols of the selected non-consecutive OFDM symbols.

8. The method of claim 5, comprising selecting non-consecutive OFDM symbols based on one or more of: a specification, a configuration communicated in a 5G master information block, a radio resource control (RRC) signal, a configuration communicated in a 5G system information block, a physical cell identifier, a virtual cell identifier, or a subframe/subframe/slot index.

9. An apparatus for a user equipment (UE) configured to process symbols in a synchronization subframe, comprising:
   a digital baseband interface configured to receive the synchronization subframe from RF circuitry; and
   a baseband processor configured to cause the UE to
   receive demodulation reference symbols (DM-RS) in non-consecutive orthogonal frequency division multiplexing (OFDM) symbols in the synchronization subframe, wherein the DM-RS are received in identical first sets of subcarriers in respective OFDM symbols of the non-consecutive OFDM symbols for a Physical Broadcast Channel (PBCH) on a same transmit beam from a base station, wherein a gap between two subcarriers in a respective set of the identical first sets of subcarriers is three subcarriers; and
   receive the PBCH on identical second sets of subcarriers in respective OFDM symbols of the non-consecutive OFDM symbols.

10. The apparatus of claim 9, wherein the baseband processor is further configured to cause the UE to receive the PBCH on adjacent frequency resources to a synchronization signal.

11. The apparatus of claim 10, wherein the baseband processor is further configured to cause the UE to receive a primary synchronization signal (PSS) and a second synchronization signal (SSS) on different symbols of the non-consecutive OFDM symbols.

12. The apparatus claim 9, wherein the non-consecutive OFDM symbols are selected based on one or more of: a specification, a configuration communicated in a 5G master information block, a radio resource control (RRC) signal, a configuration communicated in a 5G system information block, a physical cell identifier, a virtual cell identifier, or a subframe/subframe/slot index.

13. The apparatus of claim 9, wherein the baseband processor is further configured to calculate a phase difference on resource elements (REs) of the PBCH between the non-consecutive OFDM symbols to estimate a frequency offset.

14. A method, comprising:
   receiving demodulation reference symbols (DM-RS) in non-consecutive orthogonal frequency division multiplexing (OFDM) symbols in a synchronization frame, wherein the DM-RS are received in identical first sets of subcarriers in respective OFDM symbols of the non-consecutive OFDM symbols for a Physical Broadcast Channel (PBCH) on a same transmit beam from a base station, wherein a gap between two subcarriers in a respective set of the identical first sets of subcarriers is three subcarriers; and
   receive the PBCH on identical second sets of subcarriers in respective OFDM symbols of the non-consecutive OFDM symbols.

15. The method of claim 14, further comprising receiving the PBCH on adjacent frequency resources to a synchronization signal.

16. The method of claim 15, further comprising receiving a primary synchronization signal (PSS) and a second synchronization signal (SSS) on different symbols of the non-consecutive OFDM symbols.

17. The method of claim 14, wherein the non-consecutive OFDM symbols are selected based on one or more of: a specification, a configuration communicated in a 5G master information block, a radio resource control (RRC) signal, a configuration communicated in a 5G system information block, a physical cell identifier, a virtual cell identifier, or a subframe/subframe/slot index.

18. The method of claim 14, further comprising calculating a phase difference on resource elements (REs) of the PBCH between the non-consecutive OFDM symbols to estimate a frequency offset.

* * * * *